June 29, 1926.  F. GELSTHARP  1,590,819
APPARATUS AND PROCESS FOR MAKING SHEET GLASS
Filed Oct. 7, 1924    2 Sheets-Sheet 1

June 29, 1926.  
F. GELSTHARP  
1,590,819  
APPARATUS AND PROCESS FOR MAKING SHEET GLASS  
Filed Oct. 7, 1924     2 Sheets-Sheet 2

INVENTOR  
Frederick Gelstharp  
by  
James C. Bradley  
atty.

Patented June 29, 1926.

1,590,819

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

APPARATUS AND PROCESS FOR MAKING SHEET GLASS.

Application filed October 7, 1924. Serial No. 742,181.

Figure 1:
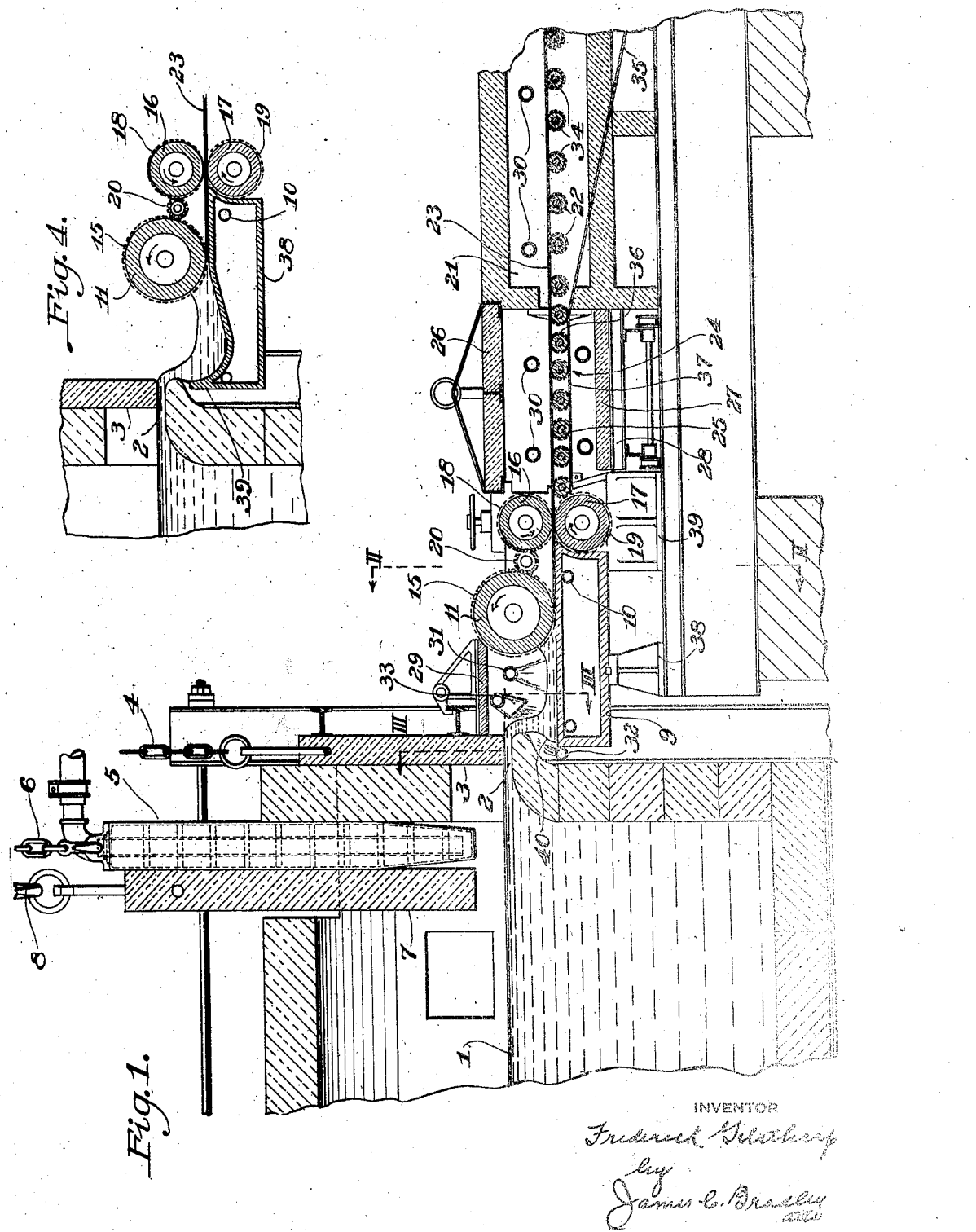
Figure 2:
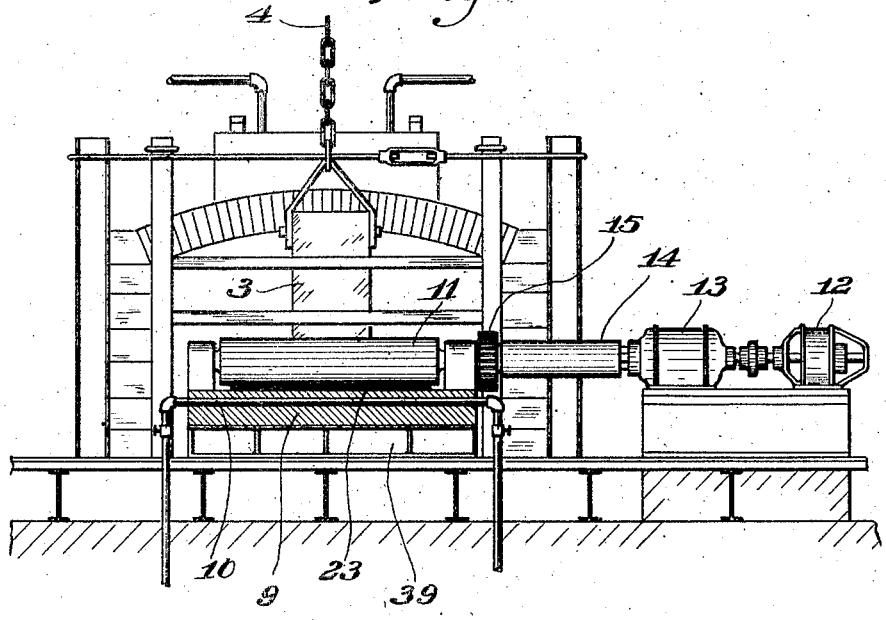
Figure 3:
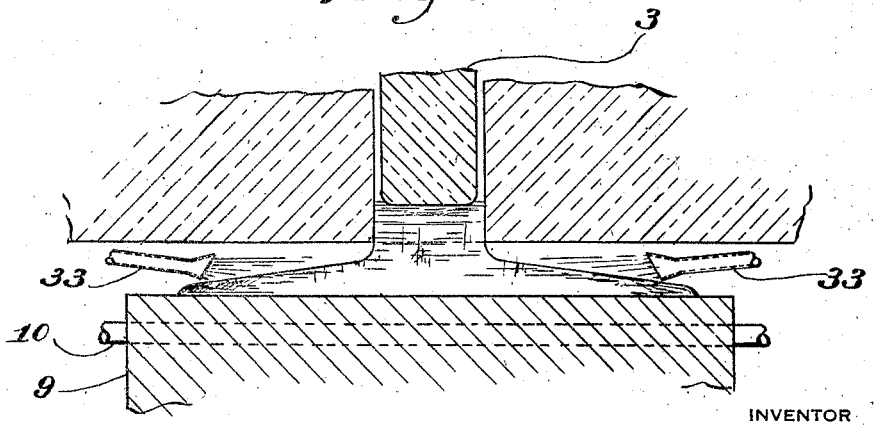

The invention relates to an apparatus and process for making sheet glass continuously from a tank. It has for its principal objects the provision of an improved apparatus and process, wherein the contact of the molten glass with the clay work at the end of the tank is reduced to a minimum, thus reducing the contamination of the glass tending to cause string and ream to a minumum; and wherein the lengthening of any bubbles in the glass incident to the rolling and sizing action is reduced, so that the visibility of such bubbles in the finished product is made as slight as possible, a round or slightly elongated bubble being much less noticeable than one which is stretched to a length several times that of the original one. Certain embodiments of the invention are illustrated in the accompanying drawings wherein:

Figure 1 is a longitudinal vertical section through the apparatus. Fig. 2 is a transverse section on the line II—II of Fig. 1. Fig. 3 is a transverse section on the line III—III of Fig. 1. And Fig. 4 is a vertical section through a modification.

Briefly stated, the process consists in flowing the glass laterally in a stream over a dam or lip or through a slot or opening in the side wall of the melting tank, receiving the glass upon a spreading table, where it piles up and spreads out in a layer of much greater width than that of the outlet slot, and then passing the glass beneath a sizing roll disposed above the table, intermediate its ends, traction force being applied to the glass in advance of the roll whereby it is continuously drawn over the surface of the table and beneath the sizing roll. This continuously and progressively removes the chilled bottom surface, which is formed as the molten glass comes in contact with the water cooled table. This chilled skin transmits the traction over the surface of the table from the point where the hot glass first touches it, so that at no time is there stagnant glass remaining on the table. This prevents any tendency for devitrification to take place. The chilled skin in a great measure insulates the molten glass above it and the progress of the mass of glass is such that the chilled outside surfaces are removed automatically in the formation of the sheet. If it were not for this action, it would not be possible to pour metal on a stationary table in front of a pair of rolls and continue to form a sheet from it.

This procedure also tends to prevent an elongation of any bubbles in the glass, which the sizing might otherwise cause, since the lateral spreading of the glass on the table, preliminary to sizing, tends to widen them laterally, and thus tends to counteract the lengthening tendency due to the sizing.

By the use of a stationary spreading table, it is possible to obtain the minimum length of clay lip over which the molten glass must flow, thus preserving the quality of the glass due to freedom from contamination by clay. Other methods which have been used require a clay transporting surface two to three times longer than by this method. The spreading action of the sheet may be adjusted by regulating the feed of the molten glass to the table in relation to the speed with which the glass sheet is withdrawn from the forward side of the sizing roll, and by varying the temperature of the glass before or after it passes onto the table or both.

Referring to the drawings, 1 is the outlet end of a melting tank, preferably of the well known regenerator type, having an outlet 2 below the level of the glass in the tank, and controlled by means of the gate 3, supported upon suitable means 4 for adjusting its vertical position. Back of this regulating gate is a water cooled cut off gate 5, also mounted for vertical movement upon the chains 6, and adapted to entirely cut off the supply of glass in case of emergencies, or in case it becomes necessary to shut down the tank for any considerable time for replacements or repairs. Back of the gate 5 is a shade 7 of clay supported upon the chains 8, which may be lowered to the surface of the glass when the gate 5 is lowered, so that the glass back of the gate will not be unduly chilled by the water cooled gate during the shut down. The water cooled gate is provided with inlet and outlet pipes, as is common in apparatus of this kind, so that a cooling circulation of water may be maintained.

Forward of the outlet 2, in position to receive the glass, is the table 9, which table is preferably made hollow and has a polished surface. Water is circulated through the table in order to produce a chilled skin on the bottom surface of the glass. This table is much wider than the outlet 2 (preferably from six to twelve times as wide), so that a sheet may be formed which is several times as wide as the outlet, the purpose being to cause the glass to spread laterally upon the table, preliminary to sizing by means of the roll 11. This roll is cooled by circulating water therethrough, and is driven in the direction indicated by the arrow from the motor 12, (Fig. 2), through the intermediary of the reduction gearing in the casing 13 and the tumbler shaft 14. The shaft of this roll carries the spur gear 15. The table is referred to in the claims as stationary in the sense that its upper surface is stationary with respect to the glass during the operation, as opposed to the type of table heretofore contemplated which is made in the form of a forwardly moving endless carrier which moves along with the glass.

Forward of the sizing roll 11, are a pair of traction rolls 16 and 17, also water cooled, and carrying spur gears 18 and 19. A pinion 20, interposed between the gears 15 and 18 serves to drive the gears 18 and 19 from the gear 15.

After passing the traction rolls 16 and 17, the glass sheet is conducted through the leer 21, which may be of any approved form, but is preferably heated by gas burners, and is provided with a series of driven rollers 22 upon which the continuous glass sheet 23 is supported and carried forwardly. Intermediate the traction rollers and the leer is an apron 24, also provided with driven rollers 25 for supporting the glass sheet. This apron is surrounded by a clay wall to prevent the glass cooling too rapidly at this point, including a portable cover 26 and a bottom 27 carried upon a truck 28, thus providing for the removal of the apron to give access to the end of the leer and the rolling mechanism in case replacements or repairs are required. The space between the tank end and the sizing roll 11 is also provided with a removable cover 29 to reduce the reduction of heat at this point. Gas burners are employed at the openings 30 for giving the desired temperature, and a pair of transversely extending burners 31 and 32 are provided for securing the proper temperature in the glass upon the table 9. In some cases air instead of gas, may be supplied through the pipe 32 as a cooling medium to control the back flow of the glass at 40. The burners 33 are directed on the side edges of the body of glass on the table and assist in regulating the spreading of the glass laterally and also prevent too rapid cooling of the edges and the formation of small cracks at the edges of the finished sheet, which cracks tend to cause breakage.

The leer rolls 22 are provided at their ends with sprocket wheels 34 driven from the chain 35, while the apron rolls 25 are similarly provided at their ends with sprocket wheels 36 driven from the chain 37, such chains being extended around a drive sprocket on the end of one of the rolls 22. The table 9 and the sizing and traction rolls 11, 16 and 17 are supported from beneath by means of suitable standards 38 and 39.

In operation, the glass flows through the outlet 2 in a stream whose depth is regulated by the clay control gate 3. The glass is received upon the table 9, and spreads out laterally to approximately the width of the finished sheet before engaging the sizing roll 11. The glass also tends to flow to the rear, as indicated at 40 (Fig. 1), the extent being regulated by the application of heat by the gas burner 32, or it may be cooled by air through the pipe 32. The sizing roll reduces the sheet to uniform thickness, and feeds it forward to the traction rolls 18 and 19. The contact of the glass with the cooled table and cooled sizing roll produces a solidified skin on the upper and lower surfaces of the sheet, so that there is little or no stretching or thinning of the glass between the sizing roll and the traction rolls. The traction rolls feed the glass forward into the leer where the glass attains a somewhat higher temperature, preliminary to annealing. The apron rolls 25 in conjunction with the leer rolls 22 would exert sufficient pull on the sheet to carry it into the leer from the sizing roll 11, but because of the necessary softening of the skin of the glass in the entrance portion of the leer in order to secure proper annealing, the traction rolls 18 and 19 are necessary to prevent the glass from stretching either on the apron or in the hot portion of the leer. The traction rolls feed the sheet ahead at a rate which is the same as the peripheral speed of the rolls 25 and 22, so that there is no stretching of the sheet, when the sheet is reheated, preliminary to annealing. From the hot end of the leer on, the glass is very gradually cooled through the critical annealing range, and then down to a point where it may be cut and handled at the outlet end of the leer. The glass thus produced, is flat and has a surface which requires a minimum amount of grinding preliminary to polishing.

Since the glass is spread laterally preliminary to sizing, any tendency of the sizing to lengthen bubbles in the glass is neutralized, so that such bubbles retain their spherical form instead of being rolled or drawn into strings or lines which constitute much more noticeable and objectionable defects than the spherical bubbles. The lateral spreading of the glass also tends to carry the bubbles and any surface impurities, such as stones or dirt, to the side edges of the glass at which points they impair the value of the sheet produced to a minimum extent, and further, the glass at the surface where the greater portion of the bubbles collect has an opportunity to become chilled and stiffen before the sizing of the glass, so that the action of the roll does not flatten or lengthen them as would be the case if the glass were hotter and softer. The lower surface of the sheet formed is relatively smooth due to the fact that it is drawn over the polished surface of the table, so that the grinding of this surface is reduced to a minimum. It also happens that the fluid surface glass (which flows to the sides of the sheet carrying the bubbles which rise to the surface) after reaching such side edges flows around the edges of the lower side of the sheet where it receives a heavy chill before reaching the sizing roll. The bubbles are thus confined for the most part to the lower skin of glass and are consequently eliminated when such lower skin is removed in the grinding operation. The contamination of the glass by the clay work of the outlet is reduced to a minimum, because of the relatively narrow width of the slot 2, as compared with the width of the finished sheet, the outlet 2 giving less clay area in contact with the glass than a wider slot of less depth. The reduced clay contact also reduces the bubble formation. Other advantages of the construction incident to its simplicity and ease of control will be apparent to those skilled in the art.

Fig. 4 illustrates a modification in which the table 38 is inclined to the horizontal and has at its rear edge the water cooled flange 39. In other respects, this construction follows that of Figs. 1 to 3 and has the same method of operation.

What I claim is:

1. In apparatus for the manufacture of sheet glass, the combination with a tank or receptacle provided with an outlet, so as to permit the discharge therethrough of molten glass under the head pressure of the tank, a stationary spreading table in position to receive the molten glass from said outlet of a width much greater than that of said outlet, a sizing roll over the table intermediate the ends thereof, a pair of traction rolls in advance of the sizing roll for engaging the upper and lower sides of the sheet and pulling it over the surface of the table and beneath the sizing roll, and a leer in advance of said traction rolls provided with means for carrying the glass therethrough.

2. In apparatus for the manufacture of sheet glass, the combination with a tank or receptacle provided with an outlet, so as to permit the discharge therethrough of molten glass under the head pressure of the tank, a stationary spreading table in position to receive the molten glass from said outlet of a width much greater than that of said outlet, a sizing roll over the table intermediate the ends thereof, a pair of traction rolls in advance of the sizing roll for engaging the upper and lower sides of the sheet and pulling it over the surface of the table and beneath the sizing roll, means for cooling said table and the sizing roll, and a leer in advance of said traction rolls provided with means for carrying the glass sheet therethrough.

3. In apparatus for the manufacture of sheet glass, the combination with a tank or receptacle provided with an outlet, so as to permit the discharge therethrough of molten glass under the head pressure of the tank, a stationary spreading table in position to receive the molten glass from said outlet of a width much greater than that of said outlet, a sizing roll over the table intermediate the ends thereof, a pair of traction rolls in advance of the sizing roll for engaging the upper and lower sides of the sheet and pulling it over the surface of the table and beneath the sizing roll, means for cooling said table and the sizing roll, and said traction rolls, and a leer in advance of said traction rolls provided with means for carrying the glass therethrough.

4. In apparatus for the manufacture of sheet glass, the combination with a tank or receptacle provided with an outlet, so as to permit the discharge therethrough of molten glass under the head pressure of the tank, a stationary spreading table in position to receive the molten glass from said outlet of a width much greater than that of said outlet, a sizing roll over the table intermediate the ends thereof, a pair of traction rolls in advance of the sizing roll for engaging the upper and lower sides of the sheet and pulling it over the surface of the table and beneath the sizing roll, means for applying heat to the glass upon the table, and a leer in advance of the said traction rolls provided with means for carrying the glass therethrough.

5. In apparatus for the manufacture of sheet glass, the combination with a tank or receptacle provided with an outlet, so as to permit the discharge therethrough of molten glass under the head pressure of the tank, a stationary spreading table in position to receive the molten glass from said outlet of a width much greater than that of said outlet, a sizing roll over the table intermediate the ends thereof, a pair of traction rolls in advance of the sizing roll for engaging the upper and lower sides of the sheet and pulling it over the surface of the table and beneath the sizing roll, means for applying heat to the edges of the glass upon the table, and a leer in advance of said traction rolls for carrying the glass therethrough.

6. A process of making sheet glass, which consists in flowing it laterally from a receptacle in a shallow stream of less width than that of the sheet to be formed, receiving it upon a stationary spreading table, causing the glass to spread laterally to approximately the width of the sheet to be produced, applying rolling pressure to the upper side of the sheet in opposition to the table to reduce it to uniform thickness, applying tractive force to the upper and lower surfaces of the sheet in advance of the table to advance the sheet continuously over the table and then continuously annealing the sheet.

7. A process of making sheet glass, which consists in flowing it laterally from a receptacle in a shallow stream of less width than that of the sheet to be formed, receiving it upon a stationary spreading table, cooling the table, applying rolling pressure to the upper side of the sheet in opposition to the table to reduce it to uniform thickness, applying tractive force to the upper and lower surfaces of the sheet in advance of the table to advance the sheet continuously over the table and then continuously annealing the sheet.

8. A process of making sheet glass, which consists in flowing it laterally from a receptacle in a shallow stream upon a stationary table, applying rolling pressure to the upper side of the sheet in opposition to the table to reduce it to uniform thickness, applying tractive force to the upper and lower surfaces of the sheet in advance of the table to advance the sheet continuously over the table and then continuously annealing the sheet.

9. A process of making sheet glass, which consists in flowing it laterally from a receptacle in a shallow stream of less width than that of the sheet to be formed, receiving it upon a stationary spreading table, causing the glass to spread laterally to approximately the width of the sheet to be produced, applying rolling pressure to the upper side of the sheet in opposition to the table to reduce it to uniform thickness, applying rolling tractive force to the upper and lower surfaces of the sheet in advance of the table to advance the sheet continuously over the table and then continuously annealing the sheet.

10. A process of making sheet glass, which consists in flowing it laterally from a receptacle in a shallow stream of less width than that of the sheet to be formed, receiving it upon a stationary spreading table, causing the glass to spread laterally to approximately the width of the sheet to be produced, applying heat to the glass upon the table to regulate its temperature and spreading action, applying rolling pressure to the upper side of the sheet in opposition to the table to reduce it to uniform thickness, applying tractive force to the upper and lower surfaces of the sheet in advance of the table to advance the sheet continuously over the table and then continuously annealing the sheet.

11. A process of making sheet glass, which consists in flowing it laterally from a receptacle in a shallow stream of less width than that of the sheet to be formed, receiving it upon a stationary spreading table, causing the glass to spread laterally to approximately the width of the sheet to be produced, applying heat to the glass upon the table at the side edges thereof, to regulate its temperature and spreading action, applying rolling pressure to the upper side of the sheet in opposition to the table to reduce it to uniform thickness, applying tractive force to the upper and lower surfaces of the sheet in advance of the table to advance the sheet continuously over the table and then continuously annealing the sheet.

In testimony whereof, I have hereunto subscribed my name this 23rd day of Sept., 1924.

FREDERICK GELSTHARP.